(No Model.) 2 Sheets—Sheet 1.

G. H. LANGLEY & W. T. HONESS.
ANCHOR.

No. 551,125. Patented Dec. 10, 1895.

Witnesses
H. van Oldenneel
E. A. Scott

Inventors
George Harden Langley
William Thomas Honess
by Richards
Attorney (No Model.) 2 Sheets—Sheet 2.
G. H. LANGLEY & W. T. HONESS.
ANCHOR.
No. 551,125. Patented Dec. 10, 1895.
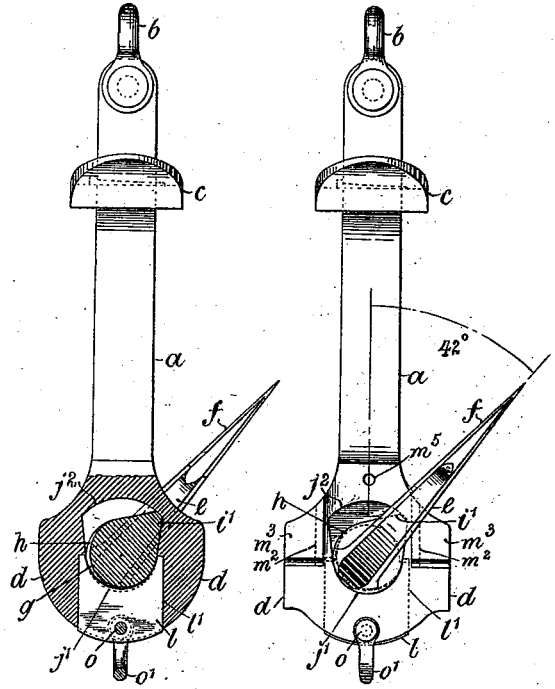
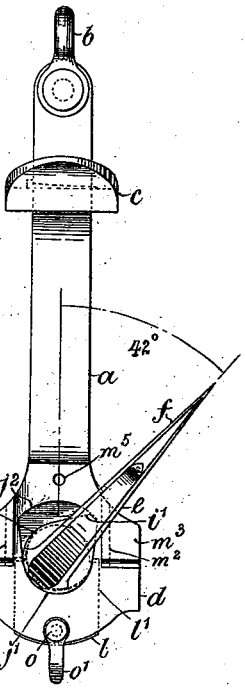
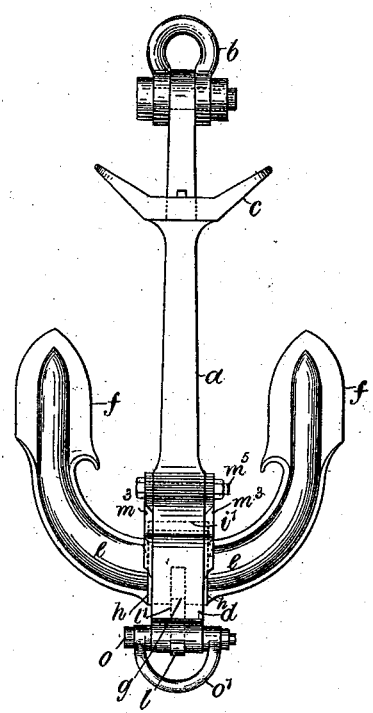
Fig. 9. Fig. 10. Fig. 11.
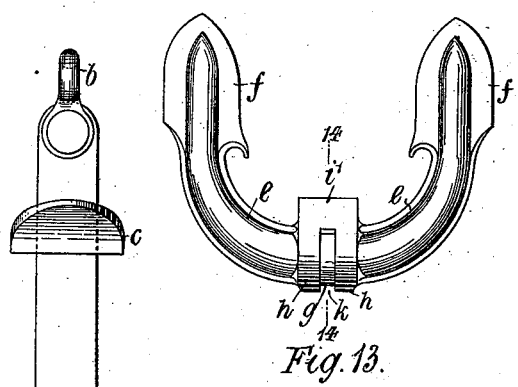
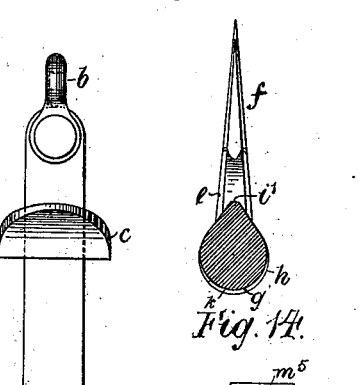
Fig. 13. Fig. 14.
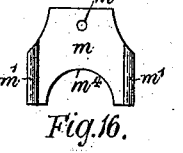
Fig. 16.
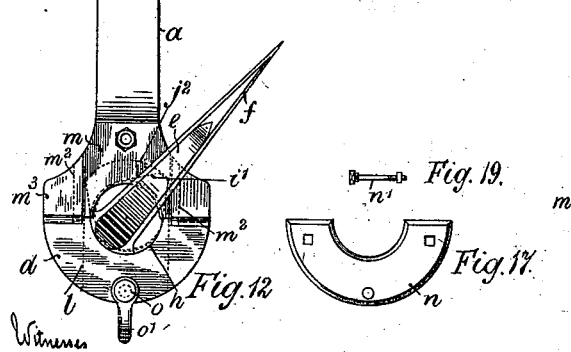
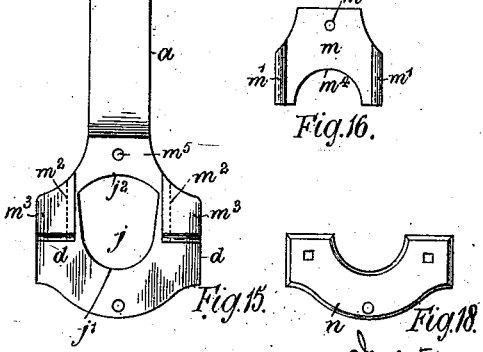
Fig. 12. Fig. 19. Fig. 17. Fig. 15. Fig. 18.
Witnesses
H. van Oldenneel
E. A. Scott
Inventors
George Harden Langley
William Thomas Honess
by Richards
Attorneys

UNITED STATES PATENT OFFICE.

GEORGE HARDEN LANGLEY AND WILLIAM THOMAS HONESS, OF LONDON, ENGLAND; SAID LANGLEY ASSIGNOR TO SAID HONESS.

ANCHOR.

SPECIFICATION forming part of Letters Patent No. 551,125, dated December 10, 1895.

Application filed June 28, 1895. Serial No. 554,330. (No model.) Patented in England November 7, 1891, No. 19,272, and October 8, 1894, No. 19,067.

*To all whom it may concern:*

Be it known that we, GEORGE HARDEN LANGLEY, of No. 25 Rattray Road, Brixton, and WILLIAM THOMAS HONESS, of No. 43 Beresford Street, Walworth, London, in the county of Surrey, England, subjects of the Queen of the United Kingdom of Great Britain and Ireland, have invented certain new and useful Improvements in Anchors, (for which we have obtained the following patents: Great Britain and Ireland, No. 19,272, dated November 7, 1891, and No. 19,067, dated October 8, 1894;) and we do hereby declare that the following is a full, clear, and exact description of the invention, reference being made to the accompanying drawings, which are to be taken as part of this specification and read therewith, and one which will enable others skilled in the art to which it appertains to make and use the same.

Our invention relates to improvements in anchors of the class distinguished by the capacity of the arms for turning in an eye in the head of the shank through an arc which dictates the angle which the said arms make with the shank on either side of it in the act of entering the ground.

Anchors of the above class are generally known as "Martin's anchors," and it is to a Martin's anchor, as the same is described in the specification of Letters Patent of the United States of America No. 31,726, dated March 19, 1861, that the improvements herein described generally, as well as in detail, and afterward claimed in detail, more particularly relate.

Figure 1:
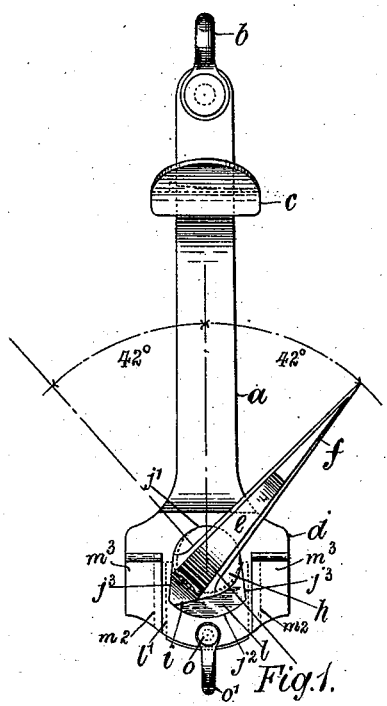
Figure 2:
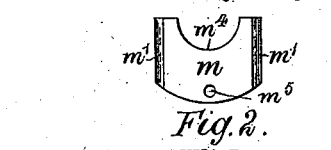
Figure 4:
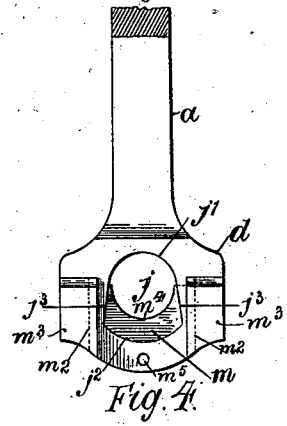
Figure 3:
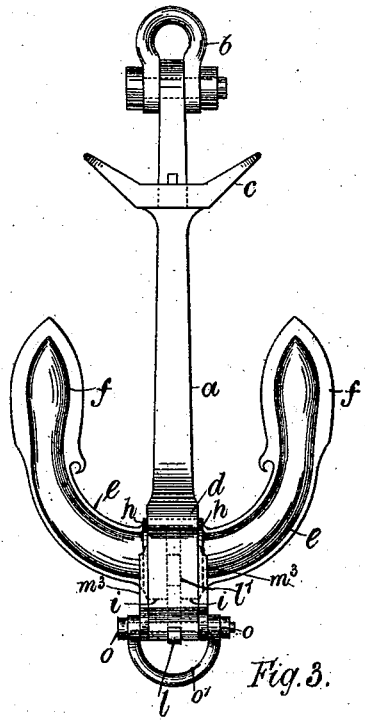
Figures 5, 6:
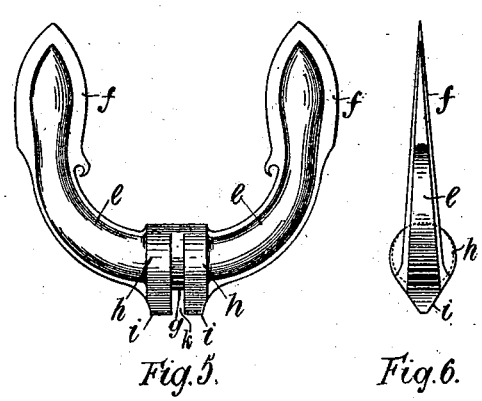
Figure 7:
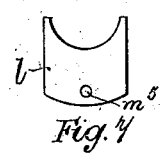
Figure 8:
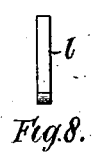

Figure 1 is a side elevation of an anchor made according to the present invention with its arms dropped to and held at an angle of forty-two degrees with the shank and without the front cover-plate. Fig. 2 is a front elevation of a cover-plate detached. Fig. 3 is a front elevation of the anchor illustrated in Fig. 1, but with the arms in the plane of the shank. Fig. 4 is a side elevation of the shank-head and the key. Fig. 5 is a front elevation of the arms and flukes. Fig. 6 is a side elevation corresponding with Fig. 5. Fig. 7 is a front, and Fig. 8 a side, elevation of the key. Fig. 9 is a sectional side elevation of an anchor made according to the present invention. Fig. 10 is a side elevation of the same anchor after removal of the front cover-plate. Fig. 11 is a front elevation of the anchor illustrated in Figs. 9 and 10, but with its arms in the plane of the shank. Fig. 12 is a side elevation corresponding with Figs. 9 and 10. Fig. 13 is a front elevation of the arms and flukes. Fig. 14 is a sectional side elevation taken on the line 14 14 of Fig. 13. Fig. 15 is a side elevation of an anchor-shank. Fig. 16 is a front elevation of a cover-plate. Figs. 17 and 18 are front elevations of alternative forms of cover-plates, and Fig. 19 of one of the bolts for holding a pair of them to the respective sides of the head of the shank.

It will be noticed that the anchor illustrated on Sheet 1 of the drawings has the stops "down"—*i. e.*, pointing outward from the crown—while that illustrated on Sheet 2 has them "up"—*i. e.*, pointing in the opposite direction.

$a$ is the anchor-shank, $b$ the cable-shackle, and $c$ the stock. The last-mentioned part may be dispensed with, if desired.

$d$ is the head of the shank.

$e\,e$ are the two arms, $f\,f$ the flukes, and $g$ the crown.

$h\,h$ are a pair of collars forged upon the central portion of the two arms symmetrically of a line bisecting the said portion. The distance across this pair of collars is equal to the length of the eye (described farther on) from one side to the other of the shank-head $d$.

$i\,i$ are the stops. Each one is an enlargement of a collar $h$. They are of the same size, and in a stops-up anchor they have combined with them a correspondingly-shaped extension $i'$ of the inner side of the central portion of the arms $e\,e$. The side faces of the stops are in the same planes, or nearly so, as the respective outer faces of the collars $h\,h$, as clearly illustrated in Figs. 5 and 13. In side elevation a stop is triangular. The sides of it are defined by lines tangential to the periphery of a collar $h$, converging on a point on a prolongation of the diameter of a collar, but stopping short of that point at an arc concentric with the collar, as clearly illustrated in (among others) Figs. 1, 6, 9, and 14.

$j$ is the eye on the shank-head. It extends, as heretofore, from one side to the other of the shank-head $d$. Its contour is decided by that of the stops, according to whether they are up or down. One side or face $j'$ of it is semicircular and has a radius only a little longer than that of a collar $h$. The opposite side $j^2$ has a radius only a little longer than the arc mentioned above in connection with the stops. Thus the faces $j'$ $j^2$ constitute the bearing-surfaces for the arms. The said faces are connected by the side faces $j^3 j^3$, which form abutments for the stops. It is to be noticed that there is in an anchor made according to the present invention a stop and its abutment on each side of the center line of the anchor-shank $a$, so that the total strains on the flukes and arms when the anchor is in use are shared equally by each stop and its abutment.

The collars $h$ $h$ (or the stops $i$ $i$, according to whether the anchor has its stops up or down) stand at a sufficient distance apart to produce the central groove $k$. The function of this groove is to receive the nose of a key $l$, which has its seating in a slot $l'$, cut down through the head of the shank, while the function of the combined key and groove is to keep the central portion of the anchor-arms in working position within the said eye. The key $l$ is held in working position by the means described farther on.

It will be noticed that in any position of the stops there will always be some vacant space between them and one, or perhaps both sides, $j^3$. To prevent sand or the like undesirable obstruction to the free motion of the arms and flukes gathering in such vacant spaces there is provided a cover-plate for each side of the shank-head. This may be of any suitable construction. Two constructions are illustrated. One of these consists of a plate $m$ having two beveled edges $m'$ $m'$, adapted to slide into and engage in two undercut grooves $m^2$ $m^2$ formed in prominences $m^3$ $m^3$, one on each side of the eye $j$. The sides of the plate $m$ are parallel, but the leading edge of it has a semicircular recess $m^4$ concentric with the axis of the central portion of the arms $e$ $e$, cut in it to enable it to embrace the respective arm $e$ immediately outside the collar $h$ as far as a transverse diameter of it. The pair of cover-plates $m$ $m$ are held to the shank-head by a bolt passed through holes $m^5 m^5$ in them and the anchor-shank in the case of a stops-up anchor. (See Figs. 10, 11, 12, 15, and 16.) An alternative construction of cover plate is illustrated in Figs. 17 to 19. It consists of a plate $n$, which is laid flat upon the side of the shank-head, the pair of plates $n$ $n$ being held thereto by bolts $n'$ $n'$, such as shown in Fig. 19.

The key $l$ is held in position by the same bolt $o$ which holds the head-shackle $o'$ to the shank-head. In the case of a stops-down anchor the cover-plates are held to the shank-head by the same bolt. (See Figs. 1, 2, and 9 to 12.)

We claim—

1. The combination with the central portion of the two arms of an anchor, of a pair of angular projections side by side, with a space between them, abutments forming part of the surface of the shank eye adapted to limit the motion of the said pair of projections in either direction about their axis and means extending into said space to hold the projections in place within the eye.

2. The combination with the central portion of the two arms of an anchor, of a pair of angular projections side by side, abutments forming part of the surface of the shank eye, adapted to limit the motion of the said pair of projections in either direction about their axis, a slot in the head of a shank opposite the space between the said projections and a key adapted to be held in the said slot and to stand with its inner end or nose in contact with the said central portion.

3. In combination, the shank head having the shank eye, the arms having the projections fitting in the eye, the key engaging the projections and extending through an opening in the shank head, the cover plate, the shackle and the shackle pin passing through the cover plates shank head and key, substantially as described.

4. In combination, the arms having the pair of angular projections with a space between them, the shank head having an eye provided with abutments to contact with the projections when the arms are moved either way, a slot in the head opposite the space between the projections, said slot being wider than the eye and the key fitting in said slot and extending into the eye and into the space between the angular projections, substantially as described.

In witness whereof we have hereunto affixed our signatures, in presence of two witnesses, this 26th day of April and 8th day of May, 1895.

GEORGE HARDEN LANGLEY.
WILLIAM THOMAS HONESS.

Witness to the signatures of George Harden Langley and William Thomas Honess:
THOMAS LAKE.

Witness to the signature of George Harden Langley:
CHAS. S. WOODROFFE.

Witness to the signature of William Thomas Honess:
HENRY H. LEIGH.